(12) United States Patent
Ono et al.

(10) Patent No.: US 7,491,456 B2
(45) Date of Patent: Feb. 17, 2009

(54) FUEL CELL ASSEMBLY AND ELECTRICITY GENERATION UNIT USED IN SAME

(75) Inventors: Takashi Ono, Kagoshima (JP); Naruto Takahashi, Kagoshima (JP); Masatoshi Ikeda, Kagoshima (JP); Kazumasa Maruya, Kagoshima (JP); Michiaki Nishimura, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 795 days.

(21) Appl. No.: 10/809,268

(22) Filed: Mar. 25, 2004

(65) Prior Publication Data

US 2004/0191593 A1 Sep. 30, 2004

(30) Foreign Application Priority Data

| Mar. 28, 2003 | (JP) | ............................. 2003-090315 |
| Aug. 20, 2003 | (JP) | ............................. 2003-295790 |
| Sep. 12, 2003 | (JP) | ............................. 2003-320542 |
| Oct. 16, 2003 | (JP) | ............................. 2003-356203 |

(51) Int. Cl.
*H01M 8/14* (2006.01)

(52) U.S. Cl. .......................................... 429/19; 429/24

(58) Field of Classification Search ................... 429/12, 429/13, 30, 34, 36, 38, 22, 24, 26
See application file for complete search history.

(56) References Cited

U.S. PATENT DOCUMENTS 3,492,162 A 1/1970 Consiglio et al.

5,330,858 A 7/1994 Shundou et al.

FOREIGN PATENT DOCUMENTS

| JP | 06196176 A | * | 7/1994 |
| JP | 2000-149976 | * | 5/2000 |

OTHER PUBLICATIONS

European Search Report for corresponding European application 04007577.2-1227 lists the references above.

* cited by examiner

*Primary Examiner*—Patrick Ryan
*Assistant Examiner*—Monique Wills
(74) *Attorney, Agent, or Firm*—Hogan & Hartson LLP

(57) ABSTRACT

A fuel cell assembly has a housing defining an electricity generation/combustion chamber, and electricity generation/combustion means disposed within the housing. A fuel gas and an oxygen-containing gas are supplied to the electricity generation/combustion means, and a combustion gas formed within the electricity generation/combustion chamber is discharged from the electricity generation/combustion chamber. A heat exchanger having a first channel and a second channel is disposed on at least one surface of the housing, the combustion gas is discharged from the interior of the electricity generation/combustion chamber through the first channel of the heat exchanger, and one of the oxygen-containing gas and the fuel gas is supplied to the electricity generation/combustion means through the second channel of the heat exchanger. A plurality of electricity generation units are arranged in parallel within the housing, and each of the electricity generation units includes a cell stack constituting the electricity generation/combustion means.

22 Claims, 9 Drawing Sheets

FUEL CELL ASSEMBLY AND ELECTRICITY GENERATION UNIT USED IN SAME

FIELD OF THE INVENTION

This invention relates to a fuel cell assembly of the type in which electricity generation/combustion means is disposed in an electricity generation/combustion chamber defined within a housing, electricity generation and combustion are performed by supplying a fuel gas and an oxygen-containing gas to the electricity generation/combustion means, and a combustion gas is discharged from the electricity generation/combustion chamber; and an electricity generation unit which can be used in such a fuel cell assembly.

DESCRIPTION OF THE PRIOR ART

In recent years, various types of fuel cell power systems, such as polymer electrolyte fuel cells, phosphoric acid fuel cells, molten carbonate fuel cells, and solid electrolyte fuel cells, have been proposed as next-generation energy sources. The solid electrolyte fuel cell power systems, in particular, operate at a high temperature of 1,000° C., but have advantages, such as a high electrical efficiency and availability of waste heat. Thus, their research and development are underway.

As disclosed in Japanese Patent Application Laid-Open No. 2000-149976, a typical example of the fuel cell power system has a fuel cell assembly of the type having an electricity generation/combustion chamber defined within a housing, and electricity generation/combustion means, including a cell stack, disposed within the electricity generation/combustion chamber. An oxygen-containing gas supply passage for supplying an oxygen-containing gap, a fuel gas supply passage for supplying a fuel gas, and a combustion gas discharge passage for discharging a combustion gas from the electricity generation/combustion chamber are annexed to the electricity generation/combustion chamber. Heat exchange means is also disposed in the fuel cell assembly. The oxygen-containing gas supply passage and the combustion gas discharge passage both extend through the heat exchange means. When the oxygen-containing gas and the combustion gas are flowed through the heat exchange means, heat exchange is carried out between these gases, whereby the oxygen-containing gas is preheated. The fuel gas in obtained by reforming a gas to be reformed (hereinafter referred to as an unreformed gas), such as city gas, into a hydrogen-rich gas. Reforming of the unreformed gas is advantageously performed by flowing the unreformed gas through a reforming case containing a required catalyst.

The conventional fuel cell assembly, however, has the following problems to be solved:

First, the heat exchange means is disposed utterly separately from the electricity generation/combustion chamber. Owing to this disposition, the assembly is considerably bulky. Moreover, heat dissipated into the atmosphere through the wall surface of the housing defining the electricity generation/combustion chamber is considerably great. Thus, utilization of waste heat is not sufficient.

Secondly, each of single cells or unit cells (hereinafter referred to simply as cells) in the cell stack disposed in the electricity generation/combustion chamber is gradually deteriorated as electricity generation proceeds. Hence, after electricity generation is performed for a predetermined period of time, the cell stack needs to be replaced by a new one. Also, the reforming action of the catalyst accommodated in the reforming case needs to be performed at a high temperature. Thus, the reforming case, like the cell stack, is also desired to be disposed within the electricity generation/combustion chamber. However, the catalyst accommodated in the reforming case is also gradually deteriorated in accordance with the performance of the reforming action, and thus should be replaced with a new one after a predetermined period of electricity generation. In the conventional fuel cell assembly, however, consideration is rarely given to work for replacement of the cell stack disposed in the electricity generation/combustion chamber, or to work for replacement of the catalyst accommodated in the reforming case. These types of work are markedly complicated.

Thirdly, the oxygen-containing gas is discharged through a discharge port formed at the front end of a pipe extending in the direction of extension of the cells, and is thus discharged in the direction of extension of the cells and supplied to each of the cells. Thus, the supply of the oxygen-containing gas no each of the cells is not necessarily effective. Furthermore, pipes disposed within the electricity generation/combustion chamber are required to have sufficient heat resistance, and thus need to be formed from a material with excellent host resistance, such as ceramic. Disposing a plurality of such pipes increases the cost of production considerably.

SUMMARY OF THE INVENTION

A first object of the present invention is to provide a novel and improved fuel cell assembly which can be constructed in a relatively compact configuration, which can effectively suppress direct heat dissipation from an electricity generation/combustion chamber into the atmosphere, and which can utilize waste heat with high efficiency.

A second object of the present invention is to make it possible to conduct, in a simplified manner, work for replacing a cell stack disposed within an electricity generation/combustion chamber of a fuel cell assembly, and work for replacing a catalyst within a reforming case similarly disposed within the electricity generation/combustion chamber.

A third object of the present invention is to provide a novel and improved fuel cell assembly which can supply an oxygen-containing gas or a fuel gas to each of cells sufficiently effectively, and whose configuration concerned with the supply of an oxygen-containing gas or a fuel gas is inexpensive compared with conventional technologies.

Other objects of the present invention will become apparent from descriptions offered below, which illustrate, in detail, the preferred embodiments of the fuel cell assembly constructed in accordance with the present invention, with reference to the accompanying drawings.

According to the present invention, the above-mentioned first object is attained by disposing a heat exchanger, which has a first channel and a second channel, on at least one surface of a housing, discharging a combustion gas from an electricity generation/combustion chamber through the first channel of the heat exchanger, and supplying one of an oxygen-containing gas and a fuel gas to the electricity generation/combustion chamber through the second channel of the heat exchanger.

That is, according to the present invention, there is provided a fuel cell assembly, as that for attaining the first object, which has a housing defining an electricity generation/combustion chamber, and electricity generation/combustion means disposed within the housing, and in which a fuel gas and an oxygen-containing gas are supplied to the electricity generation/combustion means, and a combustion gas formed within the electricity generation/combustion chamber is discharged from the electricity generation/combustion chamber, wherein a heat exchanger having a first channel and a second channel is disposed on at least one surface of the housing, the combustion gas is discharged from the inside of the electricity generation/combustion chamber through the first channel of the heat exchanger, and one of the oxygen-containing gas and the fuel gas is supplied to the electricity generation/combustion means through the second channel of the heat exchanger.

According to the present invention, moreover, the aforementioned second object is attained by constituting an electricity generation unit from a fuel gas case, which defines a fuel gas chamber fed with a reformed fuel gas from a reforming case, along with a cell stack and the reforming case.

That is, according to the present invention, the second object is attained by an electricity generation unit which comprises a fuel gas case defining a fuel gas chamber, a cell stack composed of a plurality of cells arranged on one surface of the fuel gas case, a reforming case, an unreformed gas supply pipe connected to the reforming case, and a fuel gas feed pipe connecting the reforming case and the fuel gas case, and wherein a fuel gas within the fuel gas case is supplied to the cells.

According to the present invention, as a fuel cell assembly for attaining the second object, there is provided a fuel cell assembly comprising a housing defining in electricity generation/combustion chamber, and a plurality of electricity generation units arranged in parallel within the electricity generation/combustion chamber, and wherein each of the electricity generation units comprises a fuel gas case defining a fuel gas chamber, a cell stack composed of a plurality of cells arranged on one surface of the fuel gas case, a reforming case, an unreformed gas supply pipe connected to the reforming case, and a fuel gas feed pipe connecting the reforming case and the fuel gas case, and a fuel gas within the fuel gas case is supplied to the cells.

Furthermore, according to the present invention, the aforementioned third object is attained by disposing a gas case of a unique shape having a hollow-shaped manifold portion, and a plurality of hollow-shaped ejection portions protruding from one-side flat surface of the manifold portion substantially perpendicularly to the one-side flat surface.

That is, accordingly to the present invention, there is provided a fuel cell assembly, as that for attaining the third object, which has a housing defining an electricity generation/combustion chamber, and electricity generation/combustion moons disposed within the housing, and in which the electricity generation/combustion means includes a plurality of cell stacks, a fuel gas and an oxygen-containing gas are supplied to the electricity generation/combustion means, and a combustion gas formed within the electricity generation/combustion chamber is discharged from the electricity generation/combustion chamber, wherein a first gas case supplied with one of the oxygen-containing gas and the fuel gas is disposed within the housing, the first gas case has a hollow-shaped manifold portion, and a plurality of hollow-shaped ejection portions protruding from one-side flat surface of the manifold portion substantially perpendicularly to the one-side flat surface, the ejection portions are arranged with spacing in a first direction on the one-side flat surface, an ejection hole is formed in at least one surface of each of the ejection portions, and each of the cell stacks is placed between the adjacent ejection portions.

Preferably, the first channel and the second channel in the heat exchanger are superposed in the thickness direction of the surface, and the first channel and the second channel are opposed channels extending zigzag. It is preferred that the housing has opposite flat side surfaces extending substantially vertically, and the heat exchanger is flat plate-shaped and is disposed on each of the opposite side surfaces. Preferably, there are disposed a lower gas chamber located in a lower end portion of the housing, an upper gas chamber located in an upper end portion of the housing, and a communication gas chamber extending in the up-and-down direction within the housing to bring the upper gas chamber and the lower gas chamber into communication; the second channel has an inflow port disposed at the lower end of the heat exchanger, and an outflow port disposed at the upper end of the heat exchanger and leading to the upper gas chamber; and one of the oxygen-containing gas and the fuel gas is flowed into the second channel through the inflow port, and is supplied from the second channel to the electricity generation/combustion means through the upper gas chamber, the communication gas chamber, and the lower gas chamber It is preferred that reforming means is disposed within the electricity generation/combustion chamber, the fuel gas is supplied to the electricity generation/combustion means through the reforming means, and the oxygen-containing gas is supplied to the electricity generation/combustion chamber through the second channel. Corrugate fins may be provided in the first channel and the second channel.

In a preferred embodiment, the oxygen-containing gas is supplies through the second channel of the heat exchanger. It is preferred that the plurality of cells are disposed upright on the upper surface of the fuel gas case, and the reforming case is placed above the cell stack. Preferably, in each of the electricity generation units, the fuel gas case is in a slenderly extending rectangular parallelepipedal shape, and the cells are arranged in line in the longitudinal direction of the fuel gas case. In each of the electricity generation units, it is preferred that the reforming case slenderly extends along the fuel gas case above the cell stack, the unreformed gas supply pipe is connected to one end portion of the reforming case, and the fuel gas feed pipe connects the reforming case and the fuel gas case at the other end portion of the reforming case.

In a preferred embodiment, the manifold portion is placed substantially horizontally, with the one-side flat surface being directed upwards. Preferably, the ejection hole is in the form of a slit parallel to tho one-side flat surface and extending in a second direction perpendicular to the first direction. It is preferred that a plurality of second gas cases of a hollow rectangular parallelepipedal shape placed on the one-side flat surface of the manifold portion between the adjacent ejection portions of the first gas case and extending in the second direction are disposed within the housing; the other of the oxygen-containing gas and the fuel gas is supplied to the second gas cases; and each of the cell stacks is placed on each of the second gas cases.

In other embodiments, there are provided an upper gas chamber disposed in an upper portion of the housing, and a plurality of gas introduction members hanging down from the upper gas chamber, and one of the oxygen-containing gas and the fuel gas in supplied through the upper gas chamber and the gas introduction members. Advantageously, the electricity generation/combustion means includes a plurality of cell stacks each composed of a plurality of cells, the cell stacks are arranged in parallel with spacing in the horizontal direction, and the gas introduction members; are pipes hanging down between the cell stacks and having lower ends open.

DETAILED DESCRIPTION OF THE PREFERRED EMBODIMENTS

Preferred embodiments of a fuel cell assembly constructed in accordance with the present invention will now be described in further detail with reference to the accompanying drawings.

Figure 1:
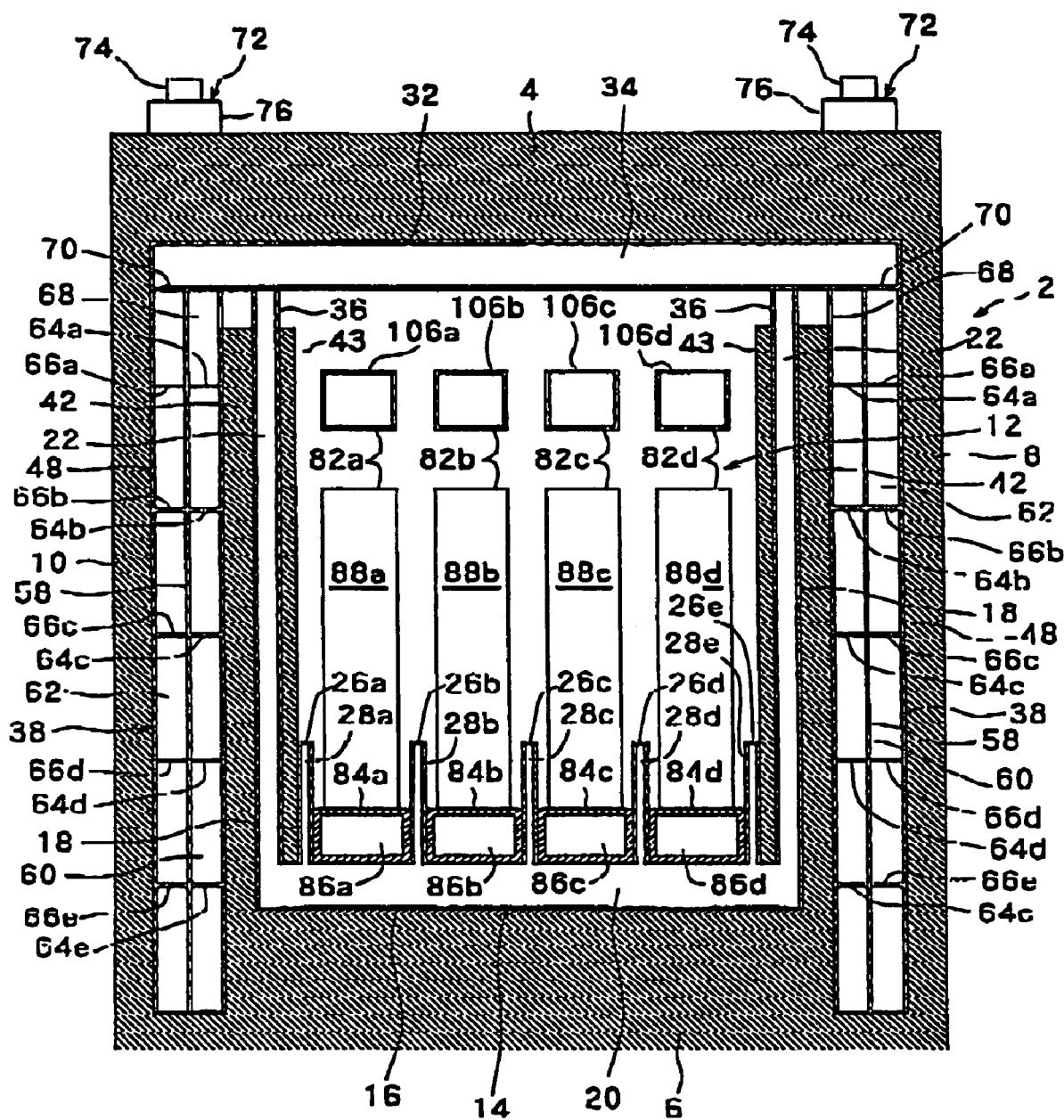
FIG. 1 is a sectional view showing the preferred embodiment of a fuel cell assembly constructed in accordance with the present invention.

With reference to FIG. 1, the illustrated fuel cell assembly has a housing 2 which may be in a nearly rectangular parallelepipedal shape. Heat insulation walls formed from a suitable heat insulating material, i.e., an upper heat insulation wall 4, a lower heat insulation wall 6, a right heat insulation wall 8, a lest heat insulation wall 10, a front heat insulation wall (not shown), and a rear heat insulation wall (not shown), are disposed on the six wall surfaces of the housing 2. An electricity generation/combustion chamber 12 is defined in the housing 2. The front heat insulation wall and/or the rear heat insulation wall are or is mounted detachably or openably and closably. By removing or opening the front heat insulation wall and/or the rear heat insulation wall, the interior of the electricity generation/combustion chamber 12 can be accessed. If desired, an outer wall which may be made of a metal plate can be disposed on the outer surface of each of the heat insulation walls.

Figure 2:
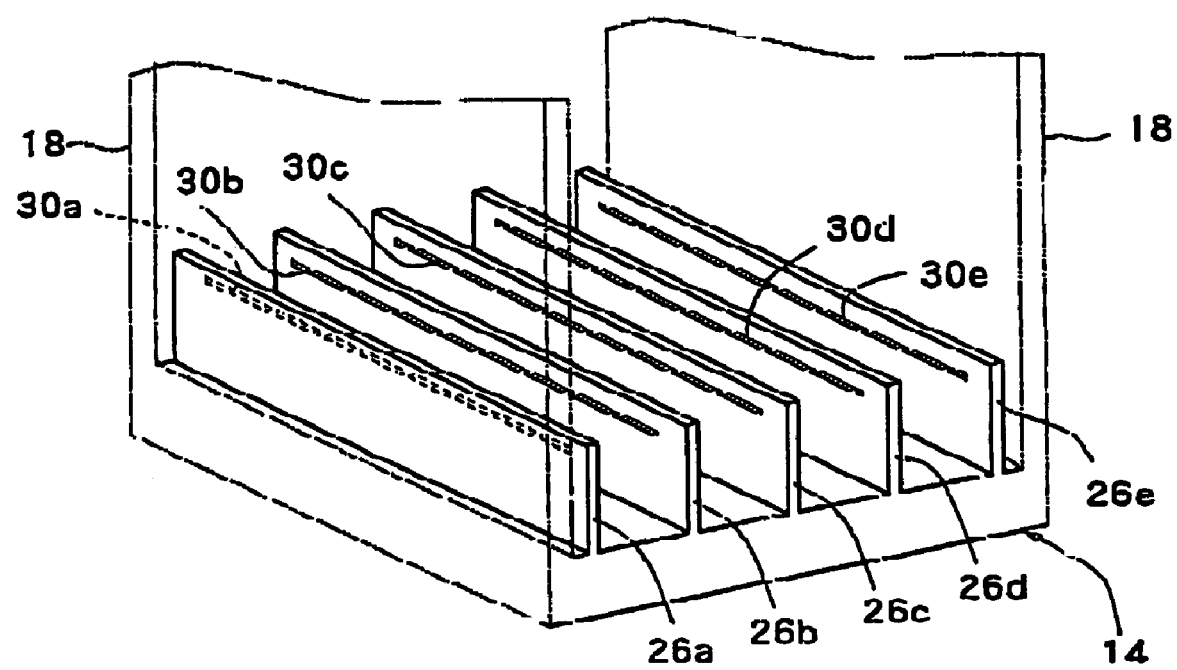
FIG. 2 is a partial perspective view showing a first gas case in the fuel cell assembly of FIG. 1.

With reference to FIG. 2 along with FIG. 1, a first gas case indicated entirely at a numeral 14 is disposed within the housing 2. In the illustrated embodiment, the first gas case 14 constitutes oxygen-containing gas supply means. The first gas case 14 has a manifold portion 16 located in a lower end portion of the interior of the housing 2, and a pair of communication portions 18 extending upwardly from both side surfaces (right and left opposite side surfaces in FIG. 1) of the manifold portion 16. The manifold portion 16 is in a hollow flat plate form, and is placed substantially horizontally. A lower gas chamber 20 is defined within the manifold portion 16. Each of the communication portions 18 is in the form of a hollow flat plate extending substantially vertically upwardly from each of the opposite side surfaces of the manifold portion 16. A communication gas chamber 22 is defined within each of the communication portions 18, and a lower end portion of the communication gas chamber 22 is brought into direct communication with the side surface of the lower gas chamber 20. The first gas case 14 further includes a plurality of (5 in the illustrated embodiment) ejection portions 26a, 26b, 26c, 26d and 26e disposed on one surface, namely, the upper surface, of the manifold portion 16. The ejection portions 26a, 26b, 26c, 26d and 26e are arranged at equal intervals in the right-and-left direction (i.e., a first direction) in FIG. 1. Each of the ejection portions 26a, 26b, 26c, 26d and 26e is in the shape of a hollow thin plate extending substantially vertically upwardly from the upper surface of the manifold portion 16 and, in the fore-and-aft direction (i.e., a second direction, a direction perpendicular to the sheet face of FIG. 1), each of the ejection portions extends over the entire length of the manifold portion 16. Ejection chambers 28a, 28b, 28c, 28d and 28e having lower end surfaces in communication with the lower gas chamber 20 are defined within the ejection portions 26a, 26b, 26c, 26d and 26e, respectively. Ejection holes 30a and 30c (FIG. 2) are formed in an upper portion of the inner surface (i.e. right surface in FIG. 1) of the ejection portion 26a and in an upper portion of the inner surface (i.e. left surface in FIG. 1) of the ejection portion 26e. On the other hand, ejection holes 30b, 30c and 30d (FIG. 2) are formed in upper portions of the opposite surfaces of the ejection portions 26b, 26c and 26d, respectively. Each of the ejection holes 30a, 30b, 30c, 30d and 30e is preferably in the form of a slit extending slenderly in the direction perpendicular to the sheet face of FIG. 1. The first gas case 14 having the manifold portion 16, the communication portions 10 and the ejection portions 26a, 26b, 26c, 26d and 26e can be advantageously formed by bonding a plurality of members, which are formed from a heat resistant ceramic or metal, with a suitable adhesive such as a ceramic-based adhesive with excellent heat resistance.

Figure 3:
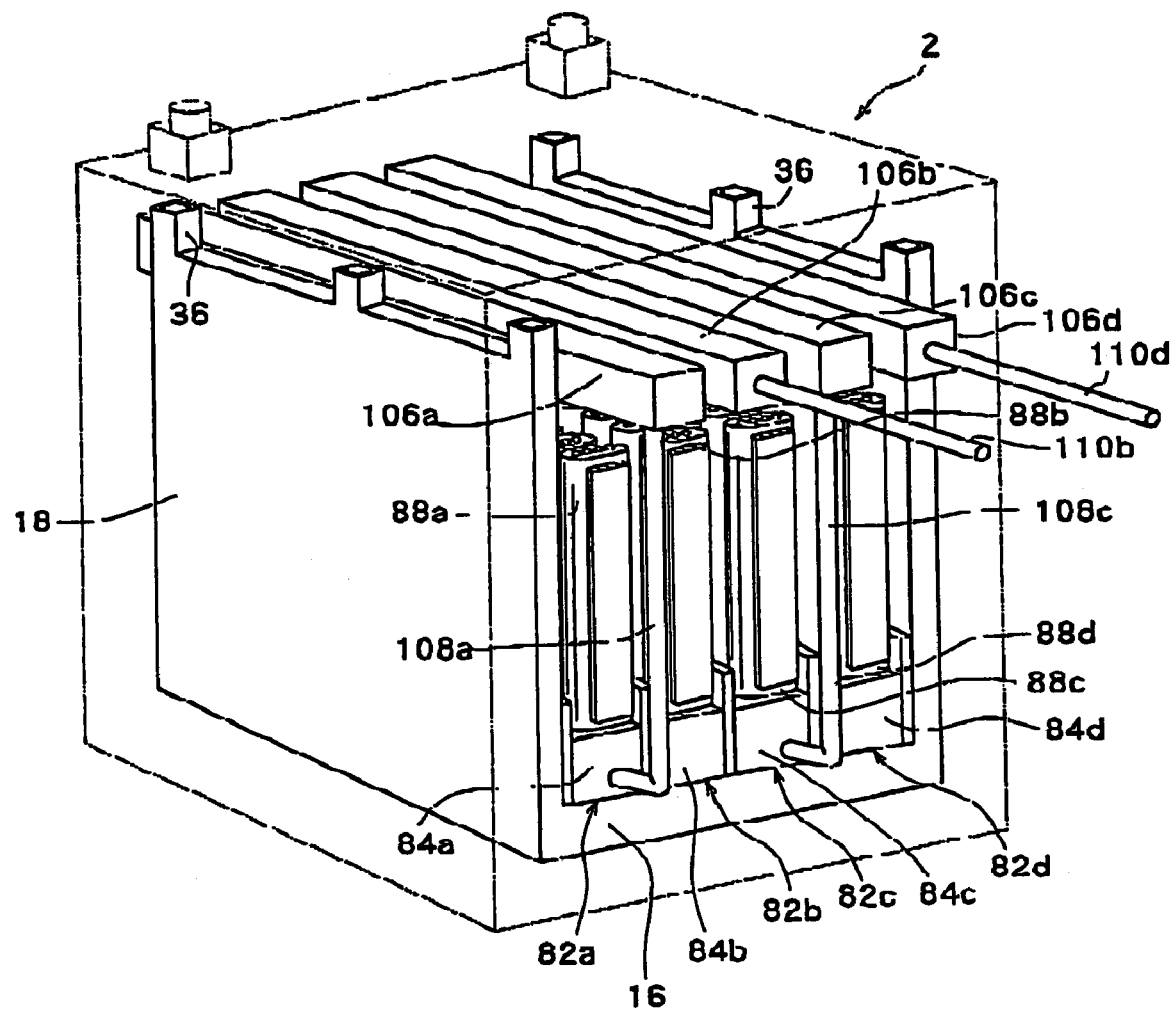
FIG. 3 is a partly abridged perspective view, showing the fuel cell assembly of FIG. 1.

With reference to FIG. 3 along with FIG. 1, an upper gas case 32 in the shape of a hollow flat plate is disposed in an upper end portion of the interior of the housing 2, and an upper gas chamber 34 is defined within the upper gas case 32. As clearly shown in FIG. 3, three communication tubes 36 are annexed, with spacing in the fore-and-aft direction, to the upper surface of the communication portion 18 of the first gas case 14. The communication gas chamber 22 is brought into communication with the upper gas chamber 34 via these communication tubes 36. Thus, the upper gas chamber 34 is in communication with the ejection chambers 28a, 28b, 28c, 28d and 28e via the communication tubes 36, the communication gas chambers 22, and the lower gas chamber 20.

In the fuel cell assembly constructed in accordance with the present invention, it is important that a plate-shaped heat exchanger be disposed on at least one surface of the housing 2. In the illustrated embodiment, a heat exchanger 30, entirely flat plate-shaped, is disposed on the inner side of each of the substantially vertically extending heat insulation walls on both sides of the housing 2, i.e., right heat insulation wall 8 and left heat insulation wall 10. A heat insulation member 42 is disposed between the heat exchanger 38 and the communication gas chamber 22. A heat insulation member 43 is disposed on the inner surface of the communication portion 18 of the first gas case 14 that defines the communication gas chamber 22.

Figure 4:
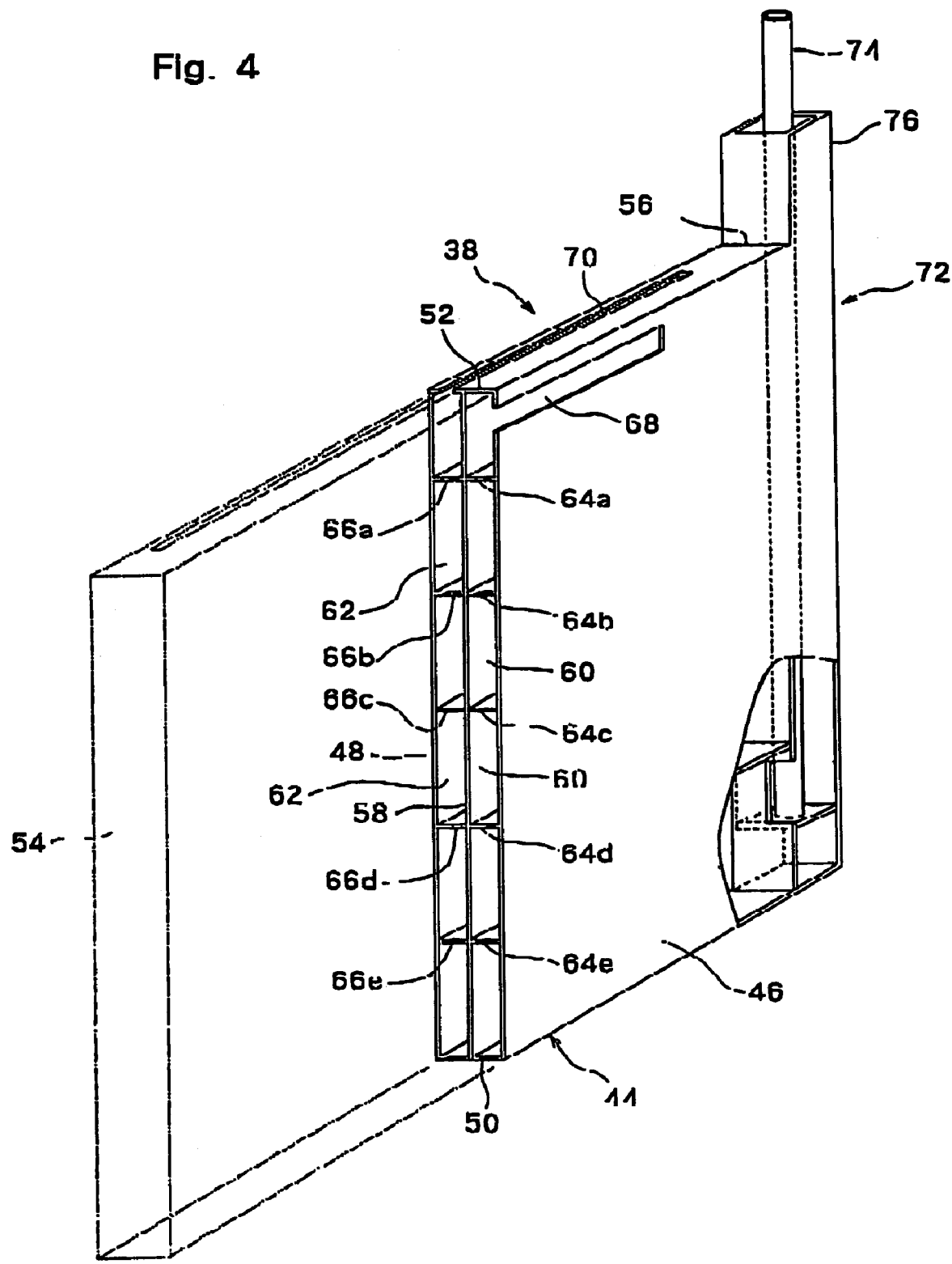
FIG. 4 is a partly broken away perspective view showing a heat exchanger and a double tubular body in the fuel cell assembly of FIG. 1.
Figure 5:
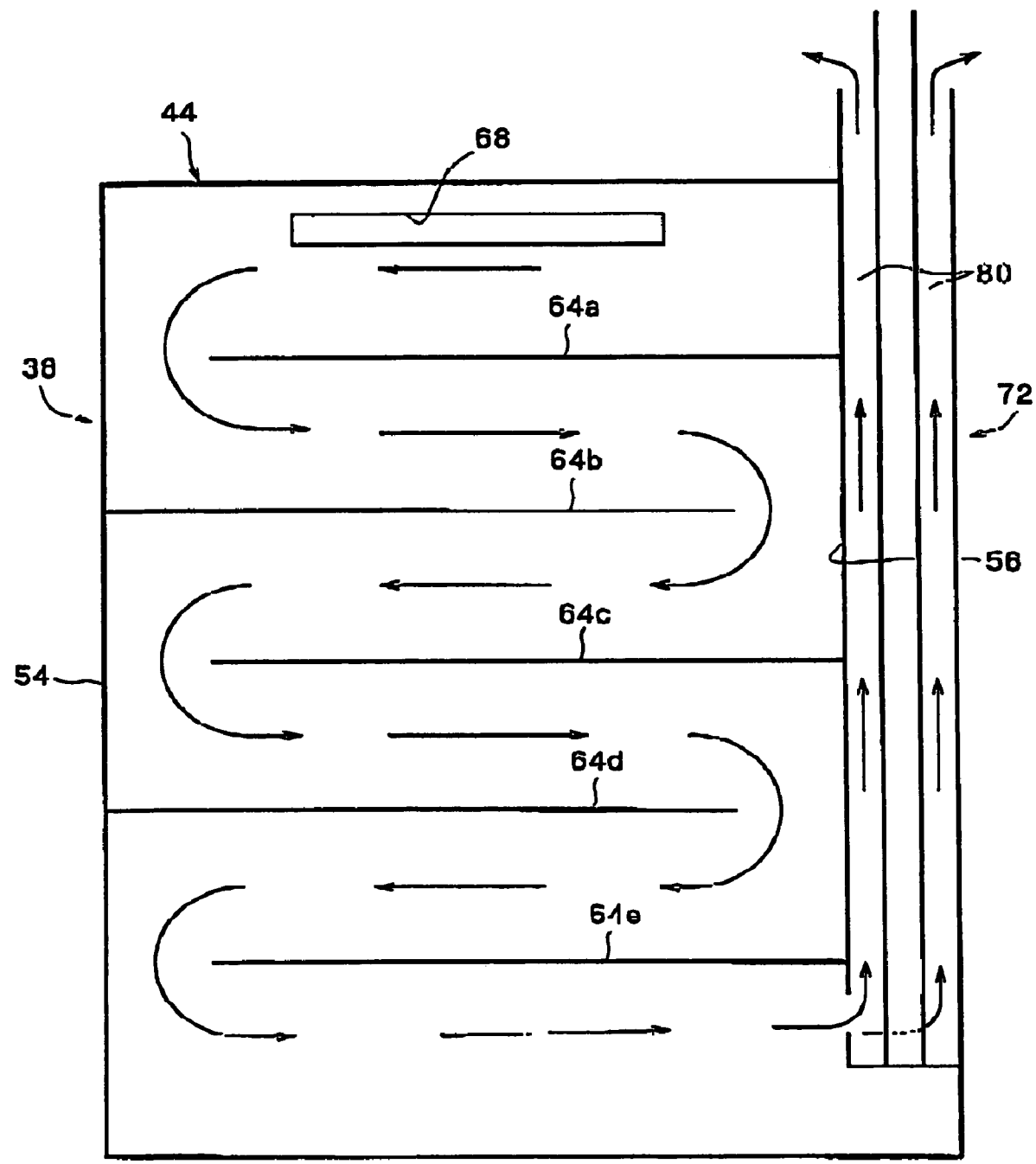
FIG. 5 is a schematic view showing a first channel formed in the heat exchanger and a combustion gas discharge passage formed in the double tubular body in the fuel cell assembly of FIG. 1.

With reference to FIG. 4 along with FIG. 1, each of the heat exchangers 38 includes a case 44 of a hollow flat plate shape extending substantially vertically. This case 44 has an inner side wall 46, an outer aide wall 48, a bottom wall 50, an upper wall 52, a front wall 54, and a rear wall 56. A partition plate 58 is disposed in the middle in the thickness direction (right-and-left direction in FIG. 1) of the case 44, whereby the interior of the case 44 is divided into two channels superposed in the thickness direction, namely, a first channel 60 located inwardly, and a second channel 62 located outwardly. With reference to FIG. 5 along with FIG. 4, five partition walls 64a, 64b, 64c, 64d and 64e extending substantially horizontally are disposed with spacing in the up-and-down direction in the first channel 60. The rear edges of the partition walls 64a, 64c and 64e are connected to the rear wall 56 of the case 44, while the front edges of the partition walls 64a, 64c and 64e are located rearwardly of and away from the front wall 54 of the case 44. On the other hand, the front edges of the partition walls 64b and 64d are connected to the front wall 54 of the case 44, while the rear edges of the partition walls 64b and 64d are located forwardly of and away from the rear wall 56 of the case 44. Thus, the first channel 60 extends zigzag as shown by arrows in FIG. 5. As will be understood by reference to FIG. 6 together with FIG. 4, five partition walls 66a, 66b, 66c, 66d and 66e extending substantially horizontally are similarly disposed with spacing in the up-and-down direction in the second channel 62. The rear edges of the partition walls 66a, 66c and 66e are connected to the rear wall 56 of the case 44, while the front edges of the partition wall 66a, 66c and 66e are located rearwardly of and away from the front wall 54 of the case 44. On the other hand, the front edges of the partition walls 66b and 66d are connected to the front wall 54 of the case 44, while the rear edges of the partition walls 66b and 66d are located forwardly of and away from the rear wall 56 of the case 44. Thus, the second channel 62 also extends zigzag as shown by arrows in FIG. 6.

Figure 6:
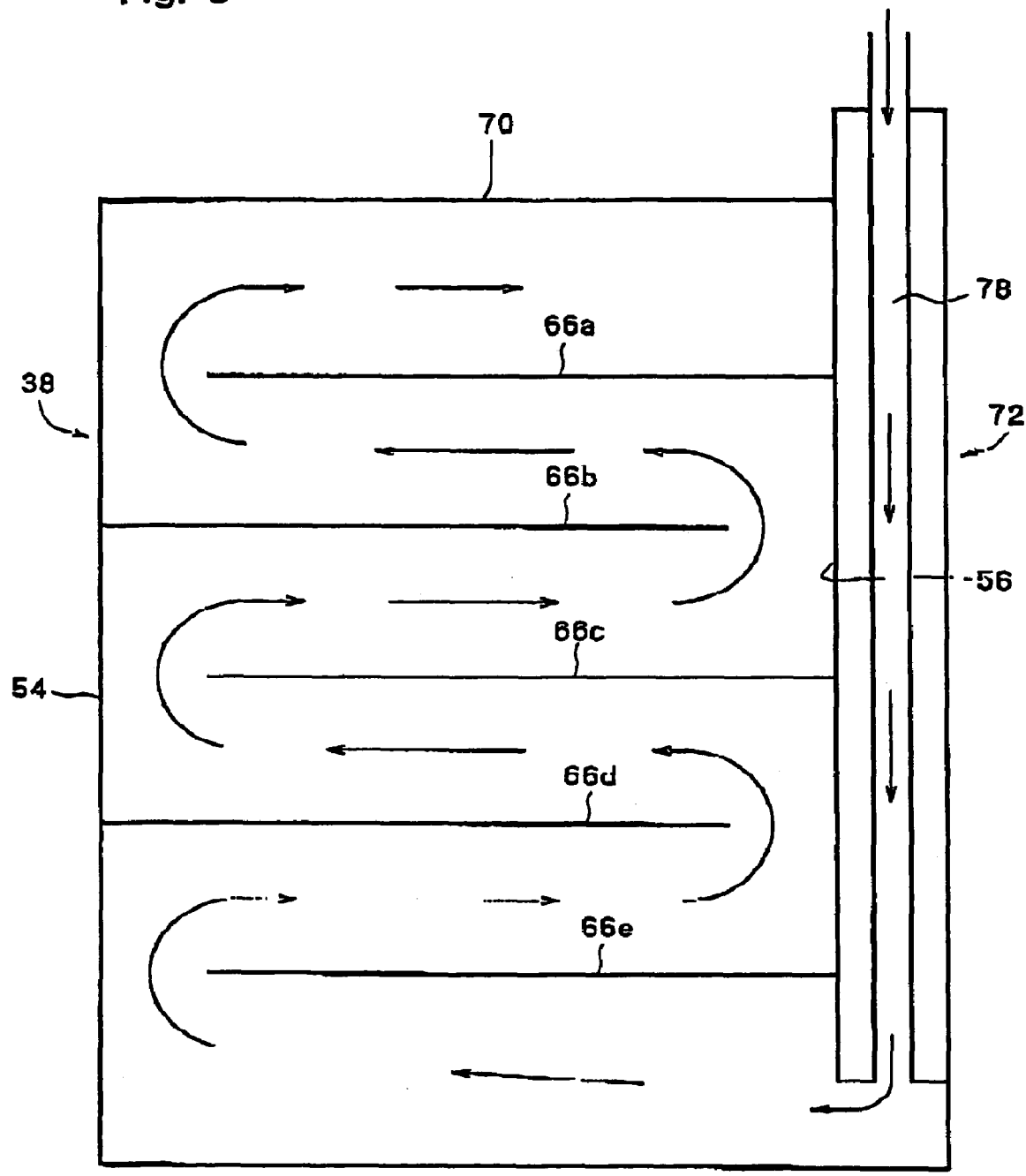
FIG. 6 is a schematic view showing a second channel formed in the heat exchanger and a gas inflow passage formed in the double tubular body in the fuel cell assembly of FIG. 1.

As shown clearly in FIG. 5, an inflow opening 68 is formed in an upper and portion of the inner side wall 46 of the case 44, and the first channel 60 communicates with the electricity generation/combustion chamber 12 via the inflow opening 68. In further detail, as will be understood by reference to FIG. 1, the upper end of the heat insulation member 42 disposed between the heat exchanger 38 and the communication gas chamber 22, and the upper end of tho heat insulation member 44 disposed on the inner side of the communication gas chamber 22 are located at substantially the same height as, or somewhat below, the lower edge of the inflow opening 66, so that the inflow opening 68 is brought into communication with the electricity generation/combustion chamber 12 through the spaces between the three communication tubes 36 disposed at the upper end of the communication gas chamber 22. As shown in FIG. 6, on the other hand, an outflow opening 70 is formed in an outer side portion of the upper wall 52 of the case 44 and, in correspondence with the outflow opening 70, an opening (not shown) is formed in the lower surface wall of the upper gas chamber 34. Thus, the second channel 62 is brought into communication with the upper gas chamber 34 via the outflow opening 70.

With reference to FIGS. 4 to 6, a double tubular body 72 extending slenderly in the up-and-down direction is disposed behind the heat exchanger 38. The double tubular body 72 includes an inner tubular member 74 of a cylindrical shape and an outer tubular member 76 in the shape of a square tube. A gas inflow passage 70 is defined within the inner tubular member 74, and a fuel gas discharge passage 80 is defined between the inner tubular member 74 and the outer tubular member 76. As clearly shown in FIG. 6, the lower end (downstream end) of the gas inflow passage 78 is in communication with the second channel 62 formed in the heat exchanger 38. AS clearly shown in FIG. 5, on the other hand, the lower end (upstream end) of the fuel gas discharge passage 80 is in communication with the first channel 60 formed in the heat exchanger 38.

Figure 7:
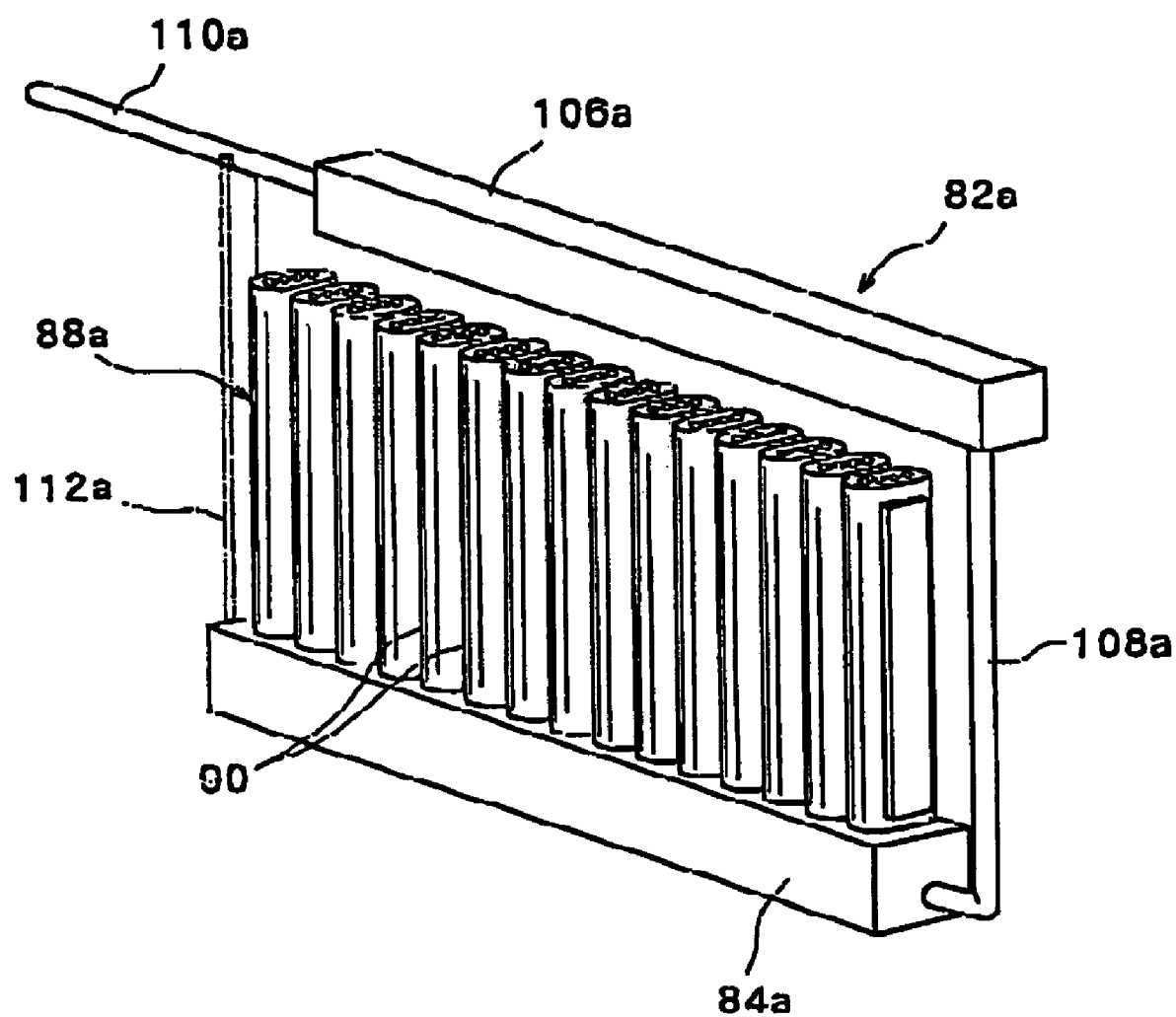
FIG. 7 is a perspective view showing an electricity generation unit used in the fuel cell assembly of FIG. 1.

Four electricity generation units 82a, 82b, 82c and 82d are placed on one surface, i.e. upper surface, of the manifold portion 16 in the aforementioned first gas case 14. The electricity generation units 82a, 82b, 82c and 82d are located receptively, between the ejection portion 26a, 26b, 26c, 26d and 26e of the first gas case 14. With reference to FIG. 7 along with FIGS. 1 and 3, the electricity generation unit 82a is furnished with a second gas case 84a of a rectangular parallelopipedal shape extending slenderly in the fore-and-aft direction (direction perpendicular to the sheet face of FIG. 1). In the illustrate embodiment, the second gas case 84a constitutes fuel gas supply means. A cell stacks 88a is mounted on the upper surface of the second gas case 84a defining a gas chamber 86a. The cell stack 88a is constituted by arranging a plurality of upright cells 90, which extend slenderly in the up-and-down direction, in line in the longitudinal direction (i.e. fore-and-aft direction) of the second gas case 84a. As clearly shown in FIG. 8, each of the cells 90 is composed of an electrode substrate 92, a fuel electrode layer 94 which is an inner electrode layer, a solid electrolyte layer 96, an oxygen electrode layer 98 which is an outer electrode layer, and an interconnector 100.

The electrode substrate 52 is a plate-shaped piece extending slenderly in the up-and-down direction, and has opposite flat surfaces and opposite semicircular side surfaces. A plurality of (four in the illustrated embodiment) fuel gas passages 102 piercing vertically through the electrode substrate 92 are formed in the electrode substrate 92. Each of the electrode substrates 92 if bonded to the top of the upper wall of the second gas case 84a using a ceramic adhesive with excellent heat resistance. A plurality of slits (not shown), which extend in the right-and-left direction with spacing in the direction perpendicular to the sheet face of FIG. 1, are formed in the upper wall of the second gas case 84a. The gas passages 102 formed in each of the electrode substrates 92 are brought into communication with each of the slits, accordingly, with the gas chamber 86a.

Figure 8:
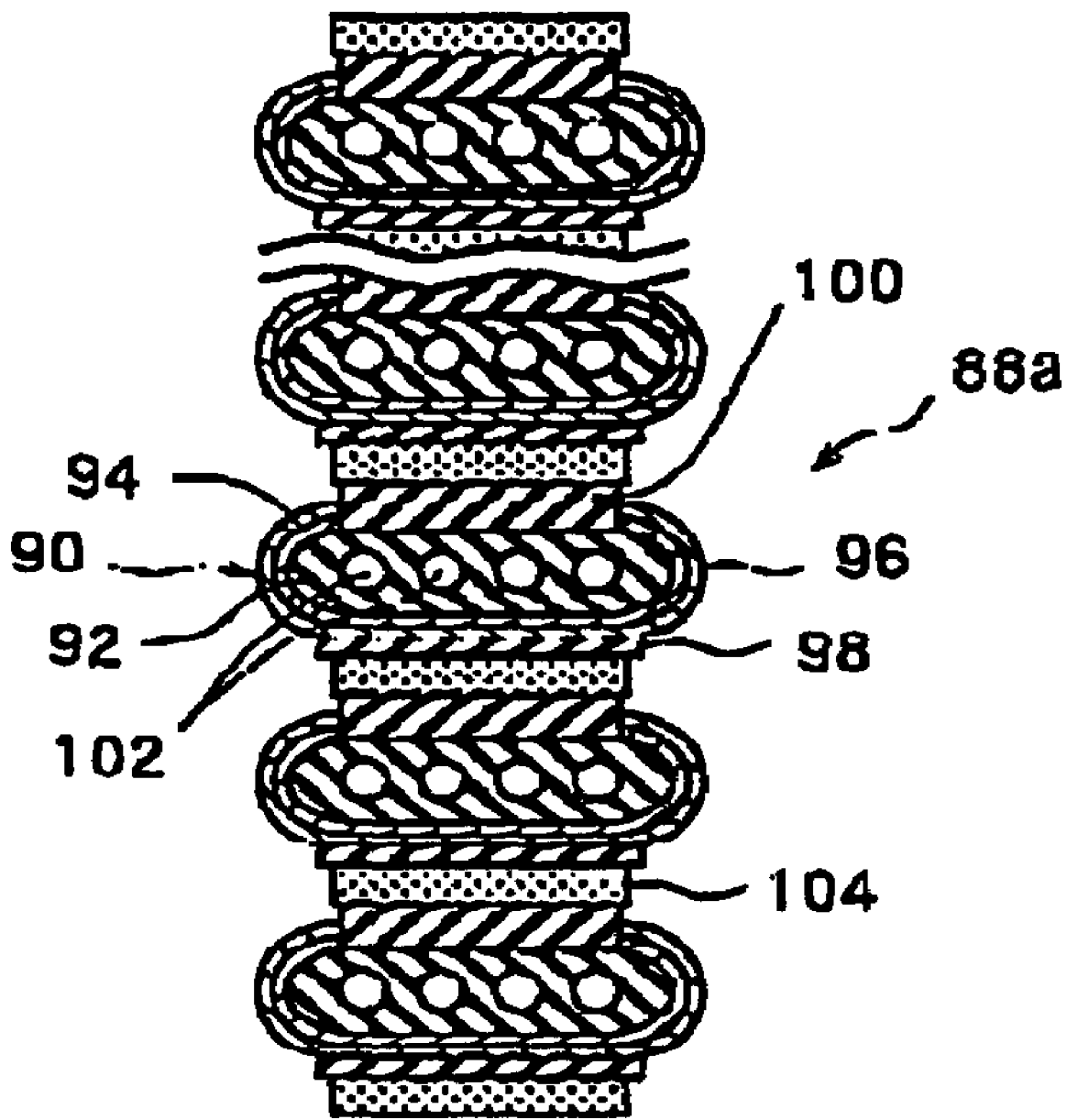
FIG. 8 is a sectional view showing a cell stack in the electricity generation unit of FIG. 7.

The interconnector 100 is disposed on one surface of the electrode substrate 92 (upper surface of the cell stack 88a in FIG. 8). The fuel electrode layer 94 is disposed on the other surface (lower surface of the cell stack 88a in FIG. 8) and opposite side surfaces of the electrode substrate 92. The opposite ends of the fuel electrode layer 94 are bonded to the opposite ends of the interconnector 100. The solid electrolyte layer 96 is disposed so as to cover the whole of the fuel electrode layer 94, and the opposite ends of the solid electrolyte layer 96 are bonded to the opposite ends of the interconnector 100. The oxygen electrode layer 98 is placed on a main portion of the solid electrolyte layer 96, namely, on a portion covering the other surface of the electrode substrate 92, and is located across the electrode substrate 92 from the interconnector 100.

A current collecting member 104 is disposed between the adjacent cells 90 in the cell stack 88a to connect the interconnector 100 of one cell 90 with the oxygen electrode layer 98 of another cell 90. The current collecting members 104 are also disposed on one surface of the cell 90 and on other surface of the cell 90, the cells 90 being located at the opposite ends of the cell stack 88a, i.e. the upper end and the lower end in FIG. 8. Electric power withdrawal means (not shown) are connected to the current collecting members 104 located at the opposite ends of the cell stack 88a. Such electric power withdrawal means extend beyond the housing 2 through the front heat insulation wall (not shown), the rear heat insulation wall (not shown) or the lower heat insulation wall 6 of the housing 2. It desired, instead of disposing the electric power withdrawal means on each of the cell stacks 88a, 88b, 88c and 88d, the cell stacks 88a, 88b, 88c and 88d may be connected together in series or in parallel by suitable connecting means, and a common electric power withdrawal means may be disposed for the four cell stacks 88a, 88b, 88c and 88d.

Further details of the cell 90 will be offered. The electrode substrate 92 is required to be gas permeable in order to allow a fuel gas to pass up to the fuel electrode layer 94, and is also required to be electrically conductive in order to permit current collection via the interconnector 100. The electrode substrate 92 can be formed from a porous conductive ceramic (or cermet) which satisfied these requirements. To produce the electrode substrate 92 by co-sintering with the fuel electrode layer 94 and/or the solid electrolyte layer 98, it is preferred to form the electrode substrate 92 from an iron family metal element and a specific rare earth element oxide. Preferably, its open porosity is 30% or higher, especially in the range of 35 to 50%, to have required gas permeability. Its conductivity is 300 S/cm or more, especially 440 S/cm or more. The fuel electrode layer 94 can be formed from a porous conductive ceramic, for example, $ZrO_2$ (called stabilized zirconia) containing a rare earth element in a solid solution, and Ni and/or NiO. The solid electrolyte layer 96 needs to have the function of an electrolyte for transferring electrons between the electrodes, and also have gas barrier properties for preventing leakage of a fuel gas and an oxygen-containing gas. Normally, the solid electrolyte layer 96 is formed from $ZrO_2$ containing 3 to 15 mol % of a rare earth element in a solid solution. The oxygen electrode layer 98 can be formed from a conductive ceramic comprising a perovskite-type oxide of the $ABO_3$ type. The oxygen electrode layer 98 is required to be gas permeable, and its open porosity is preferably 20% or more, particularly in the range of 30 to 50%. The interconnector 100 can be formed from a conductive ceramic, and is further required to have reduction resistance and oxidation resistance, because it contacts the fuel gas which may be a hydrogen gas, and the oxygen-containing gas which may be air. Thus, a lanthanum chromite-based perovskite-type oxide ($LaCrO_3$-based oxide) is used preferably. The interconnector 100 has to be of densified nature in order to prevent leakage of the fuel gas passing through the fuel gas passages 102 formed in the electrode substrate 92 and the oxygen-containing gas flowing outside of the electrode substrate 92, and in desired to have relative density of 93% or higher, especially 95% or higher. The current collecting member 104 can be constituted of a member of a suitable form formed from an elastic metal or alloy, or a member formed by applying a required surface treatment to felt comprising metal fibers or alloy fibers.

With reference to FIGS. 1, 3 and 7, the electricity generation unit 82a is also furnished with a reforming case 106a, advantageously, of a rectangular parallelopipedal shape (or a cylindrical shape) extending slenderly in the fore-and-aft direction above the cell stack 88a. One end, i.e. upper end, of a fuel gas feed pipe 108a is connected to the lower surface of a front end portion of the reforming case 106a. The fuel gas feed pipe 108a extends downward, then curves and extends rearward. The other end of the fuel gas feed pipe 108a is connected to the front surface of the second gas case 84a. One end of an unreformed gas supply pipe 110a is connected to the rear surface of the reforming case 106a. The unreformed gas supply pipe 110a extends substantially horizontally, and extends beyond the housing 2 through the rear end (not shown) of the housing 2. The unreformed gas supply pipe 110a is connected to an unreformed gas supply source (not shown), which may be a source of a hydrocarbon gas such as city gas. Thus, an unreformed gas is supplied to the reforming case 106a via the unreformed gas supply pipe 110a. A suitable reforming catalyst for reforming the unreformed gas into a hydrogen-rich fuel gas is accommodated in the reforming case 106a. In the illustrated embodiment, the reforming case 106a is connected to the second gas case 84a via the fuel gas feed pipe 108a, and is thereby held in place. If required, a suitable support member 112a can be provided, for example, between the lower surface of the unreformed gas supply pipe 110a and the upper surface of a rear end portion of the second gas case 84a or the rear surface of the second gas case 84a.

The electricity generation unit 82c is substantially the same as the aforementioned electricity generation unit 82a. The electricity generation units 82b and 82d are the same as the electricity generation units 82a and 82c, except that the electricity generation units 82b and 82d are arranged, with their fore-and-aft direction being opposite to the fore-and-aft direction of the electricity generation units 82a and 82c. In the electricity generation units 82b and 82d, therefore, the fuel gas feed pipes (not shown) for connecting the reforming cases 106b and 106d to the second gas cases 84b and 84d are arranged on the rear side, and the unreformed gas supply pipes 110b and 110d extend from the front surfaces of the reforming cases 106b and 106d through the front wall (not shown) of the housing 2. Each of the electricity generation units 82a, 82b, 82c and 82d, as will be clearly understood by reference to FIGS. 1 and 3, is placed on one surface, i.e. the upper surface, of the manifold portion 16 between the ejection portions 26a, 26b, 26c, 26d and 26e in the first gas case 14, and is fixed in place by suitable fixing means (not shown) such as bolts.

In the fuel cell assembly as described above, the unreformed gas is supplied to the reforming cases 106a, 106b, 106c and 106d via the unreformed gas supply pipes (two unreformed gas supply pipes 110b and 110d are shown in FIG. 3, and one unreformed gas supply pipe 110a is shown in FIG. 7), and is reformed into a hydrogen-rich fuel gas in the reforming cases 106a, 106b, 106c and 106d. Then, the reformed fuel gas in supplied to the fuel gas chambers 86a, 86b, 86c and 86d, which are defined within the second gas cases 84a, 84b, 84c and 84d, through the fuel gas feed pipes (two fuel gas feed pipes 108a and 108c are shown in FIG. 3), and is then supplied to the cell stacks 88a, 88b, 88c and 88d. On the other hand, the oxygen-containing gas, which may be air, is supplied to the second channel 62 of the heat exchanger 38 through the inflow passage 78 defined within the inner tubular member 74 of the double tubular body 72, and is then supplied to the ejection chambers 28a, 28b, 28c, 28d and 28a through the upper gas chamber 34, the communication gas chambers 22, and the lower gas chamber 20. Then, the oxygen-containing gas is ejected toward the cell stacks 88a, 88b, 88c and 88d through the ejection holes 30a, 30b, 30c, 30d and 30e. Since the oxygen-containing gas is ejected toward the cell stacks 88a, 88b, 88c and 88d through the ejection holes 30a, 30b, 30c, 30d and 30e, it is supplied to the cells 90 in the cell stacks 88a, 88b, 88c and 88d sufficiently effectively. In each of the cell stacks 88a, 88b, 88c and 88d, an electrode reaction indicated below $$1/2O_2 + 2e^- \rightarrow O^{2-} \text{ (solid electrolyte)}$$

is produced in the oxygen electrode. In the fuel electrode, an electrode reaction indicated below $$O^{2-} \text{ (solid electrolyte)} + H_2 \rightarrow H_2O + 2e^-$$

is produced. As a result, electricity is generated. The fuel gas and the oxygen-containing gas, which have flowed upward from the cell stacks 88a, 88b, 88c and 88d without being used for electricity generation, are ignited and burned, at the start of operation, by ignition means (not shown) disposed within the electricity generation/combustion chamber 12. As is well known, the interior of the electricity generation/combustion chamber 12 is exposed to high temperatures, for example, of the order of 1,000° C., because of electricity generation in the cell stacks 88a, 88b, 88c and 88d and combustion between the fuel gas and the oxygen-containing gas. The reforming cases 106a, 106b, 106c and 36d are disposed within the electricity generation/combustion chamber 12, and located directly above the cell stacks 88a, 88b, 88c and 88d, and are also heated directly by combustion flames. Thus, high temperatures produced within the electricity generation/combustion chamber 12 are effectively utilized for the reforming of the unreformed gas.

A combustion gas produced within the electricity generation/combustion chamber 12 flows into the first channel 60 through the inflow opening 68 formed in the heat exchanger 38, flows through the first channel 60 extending zigzag, and is then discharged through the discharge passage 80 defined between the outer tubular member 76 and the inner tubular member 74 of the double tubular body 72. When the combustion gas flows through the discharge passage 80 in the double tubular body 72, the oxygen-containing gas flows through the inflow passage 78 in the double tubular body 72, so that heat exchange takes place between the combustion gas and the oxygen-containing gas. When the combustion gas is flowed zigzag through the first channel 60 of the heat exchanger 38, the oxygen-containing gas is flowed zigzag through the second channel 62 of the heat exchanger 38. Thus, effective heat exchange takes piece between the combustion gas and the oxygen-containing gas to preheat the oxygen-containing gas. The oxygen-containing gas is heated by high temperatures within the electricity generation/combustion chamber 12 even when passing through the upper gas chamber 34, the communication gas chambers 22, and the lower gas chamber 20.

If some or all of the cell stacks 88a, 88b, 88c and 88d are deteriorated by long-term electricity generation, the following measure may be taken. The front wall (not shown) or the rear wall (not shown) of the housing 2 is removed or opened, and some or all of the electricity generation units 82a, 82b, 82c and 82d and taken out of the housing 2. Then, some or all of the electricity generation units 82a, 82b, 82c and 82d are replaced with new ones, or only the cell stacks 88a, 88b, 88c and 88d in some or all of the electricity generation units 82a, 82b, 82c and 82d are replaced with one ones, whereafter the new ones are mounted in place within the housing 2. If it is necessary to replace the reforming catalyst accommodated in the reforming cases 106a, 106b, 106c and 106d in some or all of the electricity generation units 82a, 82b, 82c and 82d, the following measure may be taken: Some or all of the electricity generation units 82a, 82b, 82c and 82d are taken out of the housing 2, and the reforming cases 106a, 106b, 106c and 106d in some or all of the electricity generation units 82a, 82b, 82c and 82d are themselves replaced with new ones, or only the reforming catalyst within the reforming cases 106a, 106b, 106c and 106d is replaced with a new one. To ensure sufficiently easy replacement of the reforming catalyst within the reforming cases 106a, 106b, 106c and 106d, part of the reforming cases 106a, 106b, 106c and 106d may be constructed as an openable and closable door, if desired.

In the illustrated embodiment, the oxygen-containing gas is supplied through the first gas case 14, while the fuel gas is supplied through the second gas cases 84a, 84b, 84c and 84d. If desired, however, the fuel gas may be supplied through the first gas case 14, while the oxygen-containing gas may be supplied through the second gas cases 84a, 84b, 84c and 84d. In the illustrated embodiment, moreover, the manifold portion 16 of the first gas case 14 is placed substantially horizontally, and the ejection portions 26a, 26b, 26c and 26d are protruded substantially vertically from the upper surface of the manifold portion 16. If desired, however, the manifold portion 16 of the first gas case 14 can be disposed substantially vertically, and the ejection portions can be protruded substantially horizontally from a vertically extending surface of the so disposed manifold portion 16. In the illustrated embodiment, moreover, the slits extending in the second direction are formed as the ejection holes 30a, 30b, 30c and 30d in the ejection portions 26a, 26b, 26c and 26d of the first gas case 14. Instead of such slits, a plurality of holes, such as circular or elliptical holes, can be formed.

Figure 9:
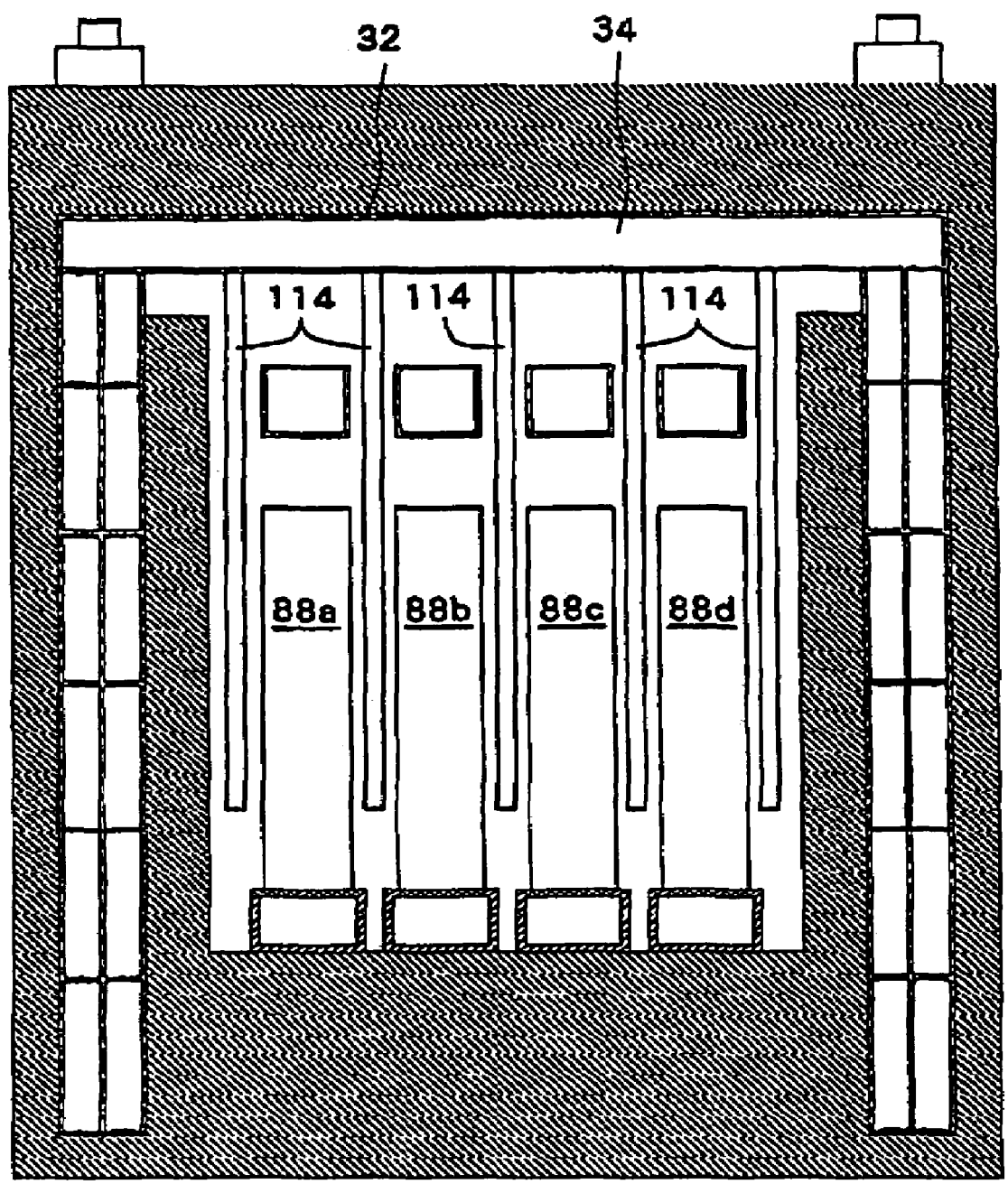
FIG. 9 is a sectional view showing a modified embodiment of a fuel cell assembly constructed in accordance with the present invention.

FIG. 9 shows a modified embodiment of a fuel cell assembly constructed in accordance with the present invention. In the modified embodiment illustrated in FIG. 9, a plurality of gas introduction members 114 hanging down from an upper gas case 32 are disposed instead of the first gas case 14 (FIGS. 1 and 2). These gas introduction members 114 may be pipes which have upper ends in communication with an upper gas channel 34 defined within the upper gas case 32, and which have lower ends open. The gas introduction members 114 are disposed with spacing in the right-and-left direction in FIG. 9, and are also disposed with suitable spacing in a direction perpendicular to the sheet face of FIG. 9. Such gas introduction members 114 are arranged between cell stacks 88a, 88b, 88c and 88d, and are also arranged to the left of the cell stack 88a and to the right of the cell stack 88d in FIG. 9. In such a modified embodiment, an oxygen-containing gas introduced into the upper gas chamber 34 flows downward through the gas introduction members 114, is then discharged into an electricity generation/combustion chamber 12, and supplied to the cell stacks 88a, 88b, 88c and 88d.

The preferred embodiments of the fuel cell assembly constructed in accordance with the present invention have been described in detail above with reference to the accompanying drawings. However, it should be understood that the present invention is not limited to these embodiments, and various modifications and corrections may be made without departing from the scope of the present invention.

What we claim is:

1. A fuel cell assembly, which has a housing defining an electricity generation combustion chamber, and electricity generation/combustion means disposed within said housing, and in which a fuel gas and an oxygen-containing gas are supplied to said electricity generation/combustion means, and a combustion gas formed within said electricity generation/combustion chamber is discharged from said electricity generation/combustion chamber, wherein a heat exchanger having a first channel and a second channel is disposed on the inner side of at least one wall of said housing, said combustion gas is discharged from an interior of said electricity generation/combustion chamber through said first channel of said heat exchanger, and one of said oxygen-containing gas and said fuel gas is supplied to said electricity generation/combustion means through said second channel of said heat exchanger, and wherein reforming means is disposed within said electricity generation/combustion chamber, said fuel gas is supplied to said electricity generation/combustion means through said reforming means, and said oxygen-containing gas is supplied to said electricity generation/combustion chamber through said second channel.

2. The fuel cell assembly according to claim 1, wherein
said first channel and said second channel in said heat exchanger are superposed in a thickness direction of said surface, and
said first channel and said second channel are opposed channels extending zigzag.

3. The fuel cell assembly according to claim 1, wherein
said housing lies opposite flat side surfaces extending substantially vertically, and
said heat exchanger is flat plate-shaped and is disposed on each of said opposite side surfaces.

4. The fuel cell assembly according to claim 1, wherein
there are disposed a lower gas chamber located in a lower end portion of said housing, an upper gas chamber located in an upper end portion at said housing, and a communication gas chamber extending in an up-and-down direction within said housing to bring said upper gas chamber and said lower gas chamber into communication,
said second channel has an inflow port disposed at a lower end at said heat exchanger, and an outflow port disposed at an upper end of said heat exchanger and leading to said upper gas chamber, and
one of said oxygen-containing gas and said fuel gas is flowed into said second channel through said inflow port, and is supplied from said second channel to said electricity generation/combustion means through said upper gas chamber, said communication gas chamber, and said lower gas chamber.

5. A The fuel cell assembly, which has a housing defining an electricity generation/combustion chamber, and electricity generation/combustion means disposed within said housing, and in which a fuel gas and an oxygen-containing gas are supplied to said electricity generation/combustion means, and a combustion gas formed within said electricity generation/combustion chamber is discharged from said electricity generation/combustion chamber,
wherein a heat exchanger having a first channel and a second channel is disposed on the inner side of at least one wall of said housing,
said combustion gas is discharged from an interior of said electricity generation/combustion chamber through said first channel of said heat exchanger, and
one of said oxygen-containing gas and said fuel gas is supplied to said electricity generation/combustion means through said second channel of said heat exchanger, wherein
a plurality of electricity generation units are arranged in parallel within said housing,
said electricity generation/combustion means includes a cell stack composed of a plurality of cells,
each of said electricity generation units includes said cell stack, a fuel gas case defining a fuel gas chamber, a reforming case, an unreformed gas supply pipe connected to said reforming case, and a fuel gas feed pipe connecting said reforming; case and said fuel gas case,
said cells off said cell stack are arranged on one surface of said fuel gas case,
said fuel gas within said fuel gas case is supplied to said cells, and
said oxygen-containing gas is supplied, through said second channel of said heat exchanger.

6. The fuel cell assembly according to claim 5, wherein
said plurality of cells are disposed upright on an upper surface of said fuel gas case, and
said reforming case is placed above said cell stack.

7. The fuel cell assembly according to claim 5,
wherein in each of said electricity generation units, said fuel gas case is in a slenderly extending rectangular parallelopipedal shape, and
said cells are arranged in line in a longitudinal direction of said fuel gas case.

8. The fuel cell assembly according to claim 5,
wherein in each of said electricity generation units,
said reforming case slenderly extends along said fuel gas case above said cell stack,
said unreformed gas supply pipe is connected to one end portion of said reforming case, and
said fuel gas feed pipe connects said reforming case and said fuel gas case at other end portion of said reforming case.

9. A fuel cell assembly, which has a housing defining an electricity generation/combustion chamber, and electricity generation/combustion means disposed within said housing, and in which a fuel gas and an oxygen-containing gas are supplied to said electricity generation/combustion means, and a combustion gas formed within said electricity generation/combustion chamber is discharged from said electricity generation/combustion chamber,
wherein a heat exchanger having a first channel and a second channel is disposed on the inner side of at least one wall of said housing,
said combustion gas is discharged from an interior of said electricity generation/combustion chamber through said first channel of said heat exchanger, and
one of said oxygen-containing gas and said fuel gas is supplied to said electricity generation/combustion means through said second channel of said heat exchanger, wherein
said electricity generation/combustion means includes a plurality of cell stacks,
a first gas case supplied with one of said oxygen-containing gas and said fuel gas is disposed within said housing,
said first gas case has a hollow-shaped manifold portion, and a plurality of hollow-shaped ejection portions protruding front one-side flat surface of said manifold portion substantially perpendicularly to said one-side flat surface,
said ejection portions are arranged with spacing in a first direction on said one-side flat surface,
an ejection hole is formed in at least one surface of each of said ejection portions, and
each of said cell stacks is placed between the adjacent ejection portions.

10. The fuel cell, assembly according to claim 9, wherein
said manifold portion is placed substantially horizontally, with said one-side flat surface being directed upwards.

11. The fuel cell assembly according to claim 9, wherein
said ejection hole is in a form of a slit parallel to said one-side flat surface and extending in a second direction perpendicular to said first direction.

12. The fuel cell assembly according to claim 9, wherein
a plurality of second gas cases at a hollow rectangular parallelopipedal shape placed on said one-side flat surface of said manifold portion between the adjacent section portions of said fuel gas case and extending in said second direction are disposed within said housing,
the other of said oxygen-containing gas and said fuel gas is supplied to said second gas cases, and each of said cell stacks is placed on each of said second gas cases.

13. The fuel cell assembly according to claim 1, further comprising
an upper gas chamber disposed in an upper portion of said housing, and
a plurality of gas introduction members hanging down from said upper gas chamber, and
wherein one of said oxygen-containing gas and said fuel gas is supplied through said upper gas chamber and said gas introduction members.

14. The fuel cell assembly according to claim 13, wherein
said electricity generation/combustion moans includes a plurality of cell stacks each composed of a plurality of cells,
said cell stacks are arranged in parallel with spacing in a horizontal direction, and
said gas introduction members are pipes hanging down between said cell stacks and having lower ends open.

15. A fuel cell assembly comprising:
a housing defining an electricity generation/combustion chamber; and
a plurality of electricity generation units arranged in parallel within said electricity generation/combustion chamber, and
wherein each of said electricity generation units comprises a fuel gas case defining a fuel gas chamber, a cell stack composed of a plurality of cells arranged on one surface of said fuel gas case, a reforming case, an unreformed gas supply pipe connected to said reforming case, and a fuel gas food pipe connecting said reforming case and said fuel gas case, and
a fuel gas within said fuel gas case is supplied to said cells.

16. The fuel cell assembly according to claim 15, wherein in each of said electricity generation units,
said plurality of cells are disposed upright on an upper surface of said fuel gas case, and
said reforming case is placed above said cell stack.

17. The fuel cell assembly according to claim 15, wherein in each of said electricity generation units,
said fuel gas case is in a slenderly extending rectangular parallelopipedal shape, and
said cells are arranged in line in a longitudinal direction of said fuel gas case.

18. The fuel cell assembly according to claim 15, wherein in each of said electricity generation units,
said reforming case slenderly extends along said fuel gas case above said cell stack,
said unreformed gas supply pipe is connected to one end portion of said reforming case, and
said fuel gas feed pipe connects said reforming case and said fuel gas case at other end portion of said reforming case.

19. A fuel cell assembly, which has a housing defining an electricity generation/combustion chamber, and
Electricity generation/combustion means disposed within said housing, and in which said electricity generation/combustion means includes a plurality of cell stacks, a fuel gas and an oxygen-containing gas are supplied to said electricity generation/combustion means, and a combustion gas formed within said electricity generation/combustion chamber is discharged from said electricity generation/combustion chamber,
wherein a first gas case supplied with one of said oxygen-containing gas and said fuel gas is disposed within said housing,
said first gas case has a hollow-shaped manifold portion; and a plurality of hollow-shaped ejection portions protruding from one-side flat surface of said manifold portion substantially perpendicularly to said one-side flat surface,
said ejection portions are arranged with spacing in a first direction on said one-side flat surface,
an ejection hole is formed in at least one surface of each of said ejection portions, and
each of said cell stacks is placed between the adjacent ejection portions.

20. The fuel cell assembly according to claim 19, wherein said manifold portion is placed substantially horizontally, with said one-side flat surface being directed upwards.

21. The fuel cell assembly according to claim 19, wherein said ejection hole is in a form of a slit parallel to said one-side flat surface and extending in a second direction perpendicular to said first direction.

22. The fuel cell assembly according to claim 19, wherein
a plurality at second gas cases at a hollow rectangular parallelopipedal shape placed on said one-side flat surface of said manifold portion between the adjacent ejection portions of said first gas case and extending in said second direction are disposed within said housing,
the other of said oxygen-containing gas and said fuel gas is supplied to said second gas cases, and
each of said cell stacks is placed on each at said second gas cases.

* * * * *